(12) United States Patent
Kodaira et al.

(10) Patent No.: US 9,335,168 B2
(45) Date of Patent: May 10, 2016

(54) ROTARY DRIVE UNIT OF A SURVEYING INSTRUMENT AND A SURVEYING INSTRUMENT

(71) Applicant: Kabushiki Kaisha TOPCON, Itabashi-ku, Tokyo-to (JP)

(72) Inventors: Jun-ichi Kodaira, Tokyo-to (JP); Naoto Miki, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 187 days.

(21) Appl. No.: 14/147,940

(22) Filed: Jan. 6, 2014

(65) Prior Publication Data

US 2014/0196293 A1    Jul. 17, 2014

(30) Foreign Application Priority Data

Jan. 17, 2013   (JP) .................................. 2013-006390

(51) Int. Cl.
*G01C 15/00* (2006.01)
*H02K 7/108* (2006.01)
*H02N 2/16* (2006.01)

(52) U.S. Cl.
CPC .............. *G01C 15/00* (2013.01); *G01C 15/002* (2013.01); *H02K 7/108* (2013.01); *H02N 2/163* (2013.01)

(58) Field of Classification Search
CPC ......... G01C 21/265; G01C 1/00; G01C 15/00
USPC ......................................................... 33/290
See application file for complete search history.

(56) References Cited

U.S. PATENT DOCUMENTS

| | | | | |
|---|---|---|---|---|
| 5,715,101 A | * | 2/1998 | Nakamura | G02B 7/08 359/696 |
| 5,987,763 A | * | 11/1999 | Ammann | G01C 1/02 33/1 PT |
| 6,643,940 B1 | * | 11/2003 | Donath | G01C 1/02 33/290 |
| 7,412,770 B2 | * | 8/2008 | Hale | G01C 1/02 33/227 |
| 8,191,271 B2 | * | 6/2012 | Petermann | G01C 1/02 33/290 |
| 2003/0145474 A1 | * | 8/2003 | Tacklind | G01C 15/004 33/290 |
| 2010/0194242 A1 | | 8/2010 | Park et al. | |
| 2014/0196293 A1 | * | 7/2014 | Kodaira | G01C 15/002 33/227 |

FOREIGN PATENT DOCUMENTS

| | | |
|---|---|---|
| JP | 2-303378 A | 12/1990 |
| JP | 6-70555 A | 3/1994 |

(Continued)

OTHER PUBLICATIONS

Leica Geosystems, Leica TS30 White Paper, Mar. 2009, pp. 1-12, Zogg, et al.

(Continued)

*Primary Examiner* — Yaritza Guadalupe-McCall
(74) *Attorney, Agent, or Firm* — Nields, Lemack & Frame, LLC

(57) ABSTRACT

A surveying instrument which comprises a rotation unit 7 adapted to direct a distance measuring optical axis to an object to be measured and the rotary drive unit 5 rotates the rotation unit, comprising a rotary motor for rotating an output shaft 6 and a clutch unit for connecting or disconnecting the rotary motor and the output shaft, wherein the rotary motor and the clutch unit are arranged in a series along the output shaft, and the output shaft is fixed to the rotation unit.

11 Claims, 3 Drawing Sheets

(56) References Cited

FOREIGN PATENT DOCUMENTS

| | | |
|---|---|---|
| JP | 11-230749 A | 8/1999 |
| JP | 2003-199370 A | 7/2003 |

OTHER PUBLICATIONS

European communication dated Mar. 30, 2015 in corresponding European patent application No. 14150237.7.

* cited by examiner

ROTARY DRIVE UNIT OF A SURVEYING INSTRUMENT AND A SURVEYING INSTRUMENT

BACKGROUND OF THE INVENTION

The present invention relates to a rotary drive unit used in a surveying instrument and to a surveying instrument using the rotary drive unit.

A surveying instrument, e.g., a total station has a telescope unit that sights a measurement point. The telescope unit is supported by a frame unit so as to be rotatable in a vertical direction, and the frame unit is supported by a base unit so as to be rotatable in a horizontal direction. Further, the total station is provided with a motor for rotating the telescope unit and a motor for rotating the frame unit. Hereinafter, the telescope unit and the frame unit will be generically referred to as a rotation unit.

Conventionally, an adopted motor is an electric motor. An output shaft of the electric motor and a rotary shaft of the rotation unit are connected via a first gear provided to the output shaft and a second gear which is provided to the rotary shaft and meshes with the first gear. Thereby a mechanism is configured so that the rotational force of the electric motor is transmitted to the rotation unit via the first gear and the second gear. Further, a backlash exists in the mesh of the first gear and the second gear. The backlash affects a rotational accuracy and a rotational positioning accuracy, and hence the backlash must be reduced as much as possible. In particular, in surveying instruments, the accuracy of a rotation angle is required in units of seconds. Therefore, highly accurate gears are required, and further, a high accuracy is also required in an assembling accuracy. Thus, the manufacturing cost is high. Furthermore, the backlash increases due to the wear and the like of the gears, and the accuracy decreases over time.

SUMMARY OF THE INVENTION

It is an object of the present invention to provide a rotary drive unit of a surveying instrument that has no error caused due to a backlash and others and has a high accuracy and a simple structure and to provide a surveying instrument comprising the rotary drive unit of the surveying instrument.

To attain the above object, in the rotary drive unit of a surveying instrument according to the present invention, the surveying instrument comprises a rotation unit adapted to direct a distance measuring optical axis to an object to be measured and the rotary drive unit rotates the rotation unit, comprising a rotary motor for rotating an output shaft and a clutch unit for connecting or disconnecting the rotary motor and the output shaft, wherein the rotary motor and said clutch unit are arranged in a series along the output shaft, and the output shaft is fixed to the rotation unit.

Further, in the rotary drive unit of a surveying instrument according to the present invention, the rotary motor rotates a driven body via a friction force, the clutch unit is interposed between the driven body and the rotation unit and configured so as to transmit the rotation of the driven body to the rotation unit via the friction force, and the friction force between the rotary motor and the driven body is set to be larger than the friction force between the driven body and the rotation unit.

Further, in the rotary drive unit of a surveying instrument according to the present invention, the driven body has a ring-like shape and the rotary motor comprises a ring-shaped vibration generating unit that provides the driven body with the rotational force, wherein the vibration generating unit generates a flexural wave motion that moves in a circumferential direction by ultrasonic vibration, and the flexural wave motion adapted to rotate the driven body via the friction force between the rotary motor and the driven body.

Further, in the rotary drive unit of a surveying instrument according to the present invention, the clutch unit has a structure to enable selecting the friction force between the rotation unit and the driven body.

Further, in the rotary drive unit of a surveying instrument according to the present invention, the clutch unit comprises a friction generating member interposed in a rotational force transmission path and a biasing means for allowing the pressing force to act on the friction generating member.

Further, in the rotary drive unit of a surveying instrument according to the present invention, the output shaft is provided so as to integrally rotate with the vibration generating unit, and the driven body is provided on a member that supports the rotation unit.

Further, a surveying instrument according to the present invention comprises a frame unit as a rotation unit provided on a base unit so as to be rotatable in the horizontal direction, a horizontal rotary drive unit provided on the base unit and drives the frame unit to rotate, a telescope unit as a rotation unit provided on the frame unit so as to be rotatable in a vertical direction, and a vertical rotary drive unit that is provided on the frame unit and drives the telescope unit to rotate, wherein a rotary drive unit is used for at least one of the horizontal rotary drive unit and the vertical rotary drive unit.

According to the present invention, in the rotary drive unit of a surveying instrument, the surveying instrument comprises a rotation unit adapted to direct a distance measuring optical axis to an object to be measured and the rotary drive unit rotates the rotation unit, comprising a rotary motor for rotating an output shaft and a clutch unit for connecting or disconnecting the rotary motor and the output shaft, wherein the rotary motor and the clutch unit are arranged in a series along the output shaft, and the output shaft is fixed to the rotation unit. As a result, the rotational force transmission path from the rotary motor to the rotation unit becomes simple and a highly accurate drive becomes possible without an error due to backlashes and the like.

Further, according to the present invention, in the rotary drive unit of a surveying instrument, the rotary motor rotates a driven body via a friction force, the clutch unit is interposed between the driven body and the rotation unit and configured so as to transmit the rotation of the driven body to the rotation unit via the friction force, and the friction force between the rotary motor and the driven body is set to be larger than the friction force between the driven body and the rotation unit. As a result, the rotation unit can be rotated manually when the rotary motor is not driven, and in a case where an excessive load acts at the time of the drive, the clutch unit rotates and prevents the rotary motor from being damaged.

Further, according to the present invention, in the rotary drive unit of a surveying instrument, the driven body has a ring-like shape and the rotary motor comprises a ring-shaped vibration generating unit that provides the driven body with the rotational force, wherein the vibration generating unit generates a flexural wave motion that moves in a circumferential direction by ultrasonic vibration, and the flexural wave motion adapted to rotate the driven body via the friction force between the rotary motor and the driven body. As a result, the rotation unit becomes a minimum structure of the driven body, the structure is simplified, and a generation state of the ultrasonic vibration of the vibration generation unit need only be controlled, hence the controlling of the rotation unit is easy.

Further, according to the present invention, in the rotary drive unit of a surveying instrument, the clutch unit has a structure to enable selecting the friction force between the rotation unit and the driven body. As a result, a rotation output can be changed without changing the basic structure.

Further, according to the present invention, in the rotary drive unit of a surveying instrument, the clutch unit comprises a friction generating member interposed in a rotational force transmission path and a biasing means for allowing the pressing force to act on the friction generating member. As a result, by adjusting the material and the pressing force of the friction generating member, a rotation output can be changed without changing the basic structure.

Furthermore, according to the present invention, a surveying instrument comprises a frame unit as a rotation unit provided on a base unit so as to be rotatable in the horizontal direction, a horizontal rotary drive unit provided on the base unit and drives the frame unit to rotate, a telescope unit as a rotation unit provided on the frame unit so as to be rotatable in a vertical direction, and a vertical rotary drive unit that is provided on the frame unit and drives the telescope unit to rotate, wherein either of the rotary drive units described above is used for at least one of the horizontal rotary drive unit and the vertical rotary drive unit. As a result, a driving system becomes simple, the number of components that require accuracy is reduced, manufacturing costs are decreased, and a highly accurate drive becomes possible.

DETAILED DESCRIPTION OF THE PREFERRED EMBODIMENT

Figure 1:
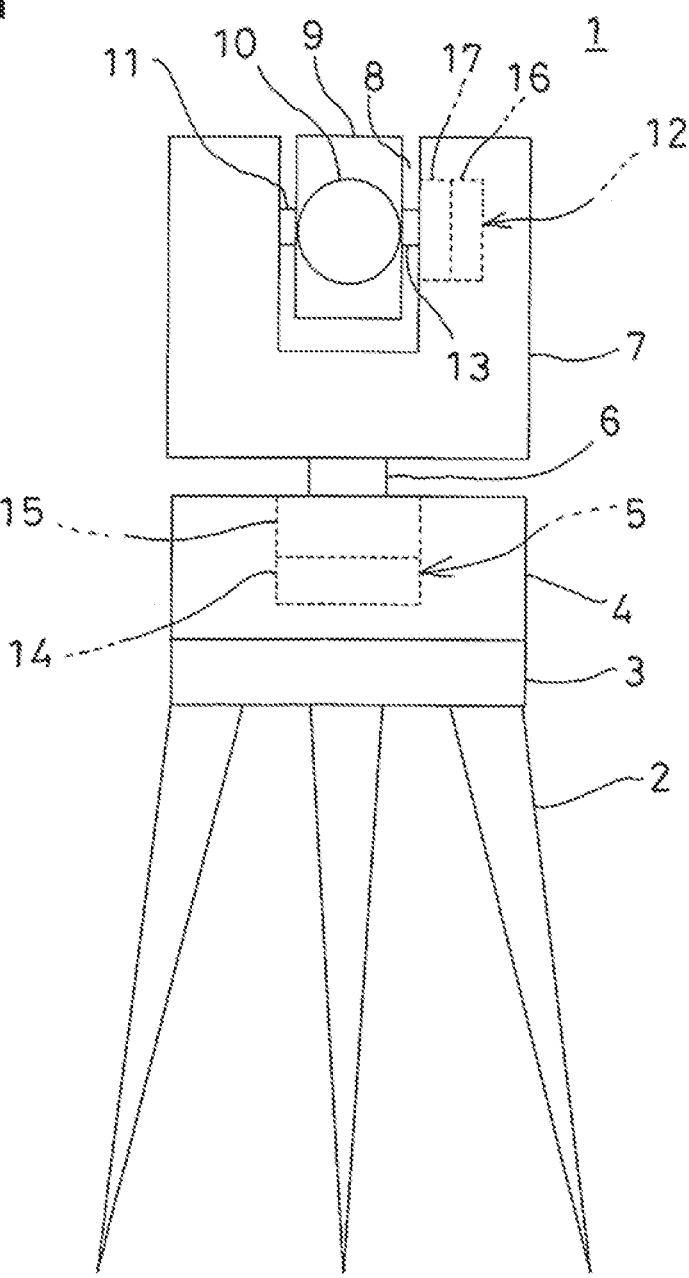
FIG. 1 is a schematical drawing showing an example of a surveying instrument according to the present invention.

An embodiment of the present invention will be described hereinafter by referring to the drawings.

A surveying instrument 1 according to the present embodiment will be described with reference to FIG. 1.

A leveling unit 3 is provided on a tripod 2, and a base unit 4 is provided on the leveling unit 3. A horizontal rotary drive unit 5 is accommodated in the base unit 4. The horizontal rotary drive unit 5 has a horizontal output shaft 6 which is hollow and extend in vertical direction, and a frame unit 7 as a rotation unit is mounted on an upper end of the horizontal output shaft 6.

The frame unit 7 has a concave portion 8, a telescope unit 9 as a rotation unit is accommodated in the concave portion 8, and the telescope unit 9 is rotatably supported in the frame unit 7 via a vertical rotary shaft 11. A sighting telescope 10 with a distance measuring optical axis is provided in the telescope unit 9, and a distance measuring unit (not shown) is accommodated in the telescope unit 9.

A vertical rotary drive unit 12 is accommodated in the frame unit 7, and the vertical rotary drive unit 12 is arranged on a shaft center line of the vertical rotary shaft 11. The vertical rotary drive unit 12 has a vertical output shaft 13 which is concentric with the vertical rotary shaft 11, and a forward end of the vertical output shaft 13 is fixedly attached to the telescope unit 9.

The horizontal rotary drive unit 5 has a rotary motor 14 and a clutch unit 15. The rotary motor 14 and the clutch unit 15 have the same shaft center line, and are arranged in series (tandem) along the horizontal output shaft 6 with the horizontal output shaft 6 as the center. When the clutch unit 15 is in a connected state, the rotational force of the rotary motor 14 is directly transmitted to the horizontal output shaft 6. When the clutch unit 15 is in a disconnected state, the horizontal output shaft 6 is disconnected from the rotary motor 14, and the horizontal output shaft 6 alone can rotate. Further, when the clutch unit 15 is in the disconnected state, the horizontal output shaft 6 and the rotary motor 14 are connected via the predetermined friction force.

Therefore, when the clutch unit 15 is in the disconnected state, the frame unit 7 can relatively rotate with respect to the horizontal rotary drive unit 5, and a position of the frame unit 7 is maintained by the friction force.

The vertical rotary drive unit 12 also has the same structure as that of the horizontal rotary drive unit 5.

The vertical rotary drive unit 12 has a rotary motor 16 and a clutch unit 17, and the rotary motor 16 and the clutch unit 17 are arranged on the same shaft center line in tandem. When the clutch unit 17 is in the connected state, the rotational force of the rotary motor 16 is directly transmitted to the vertical output shaft 13. When the clutch unit 17 is in the disconnected state, the vertical output shaft 13 is disconnected from the rotary motor 16, and the vertical output shaft 13 alone can rotate. Further, when the clutch unit 17 is in the disconnected state, the vertical output shaft 13 and the rotary motor 16 are connected via the predetermined friction force, and is so arranged that the telescope unit 9 is maintained at an arbitrary position even if the clutch unit 17 is in the disconnected state.

It is to be noted that, although not shown, a horizontal angle encoder is provided on the horizontal output shaft 6, and a rotation angle of the horizontal output shaft 6 is detected. A vertical angle encoder is provided on the vertical rotary shaft 11 so that a rotation angle of the vertical output shaft 13 can be detected.

By the cooperation of the horizontal rotation of the frame unit 7 and the vertical rotation of the telescope unit 9, a distance measuring optical axis is directed toward an object to be measured, the distance measuring unit emits a laser beam via the telescope unit 9, and a distance is measured by receiving the reflected light from the object to be measured. Further, based on the detection results of the horizontal angle encoder and the vertical angle encoder, a horizontal angle and a vertical angle are measured.

In the embodiment as described above, since the motor and the clutch unit are arranged on the same shaft center line, the horizontal rotary drive unit 5 and the vertical rotary drive unit 12 has a compact structure. Further, since the motor and the clutch unit are arranged in tandem and the rotational force of the motor is directly transmitted to the output shaft in the clutch connected state, there is no backlash, an error does not occur in the rotation transmission path, and the drive is transmitted highly accurately. Further, the assembling is easy.

It is to be noted that in the embodiment as described above, both the horizontal rotary drive unit 5 and the vertical rotary drive unit 12 are said to have a tandem type structure, but any one of these units alone may have a tandem type structure.

Next, an example where each of the horizontal rotary drive unit 5 and the vertical rotary drive unit 12 having the tandem type structure, which has an ultrasonic motor, will now be described with reference to FIG. 2 and FIG. 3.

Figure 2:
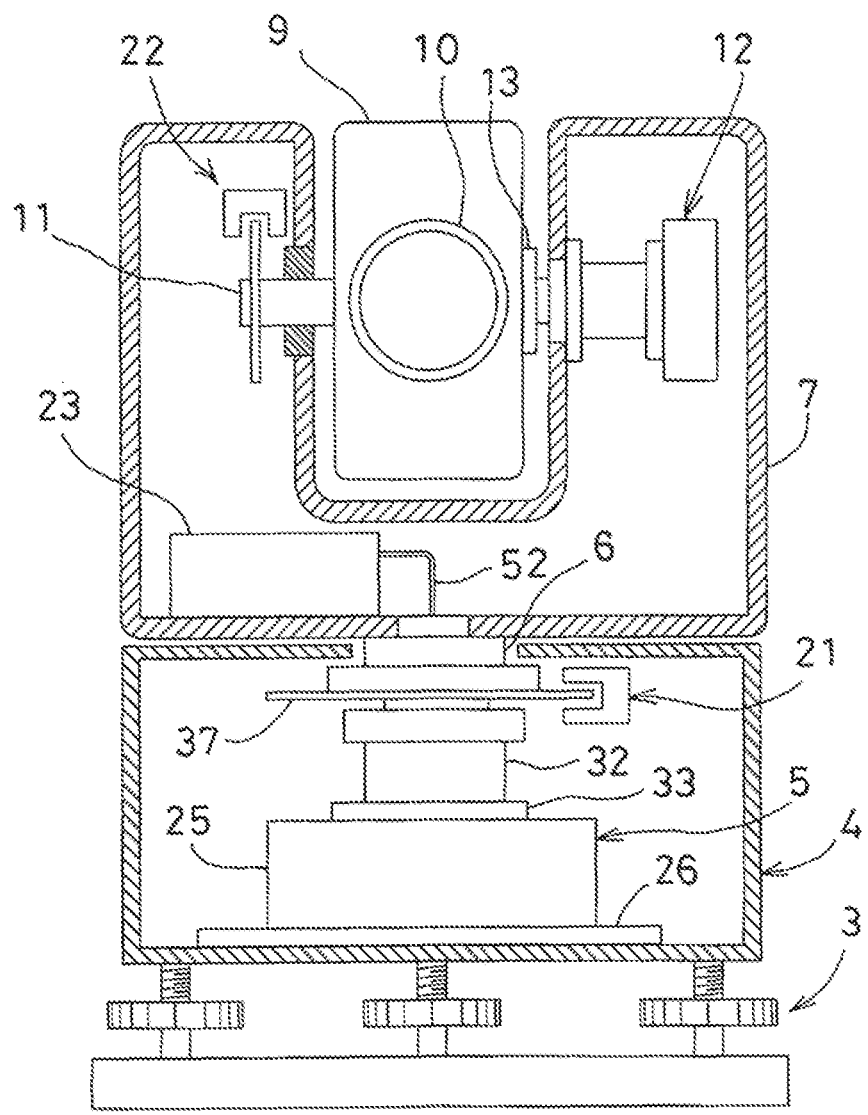
FIG. 2 is a schematic cross-sectional view of the surveying instrument according to an embodiment of the present invention.
Figure 3:
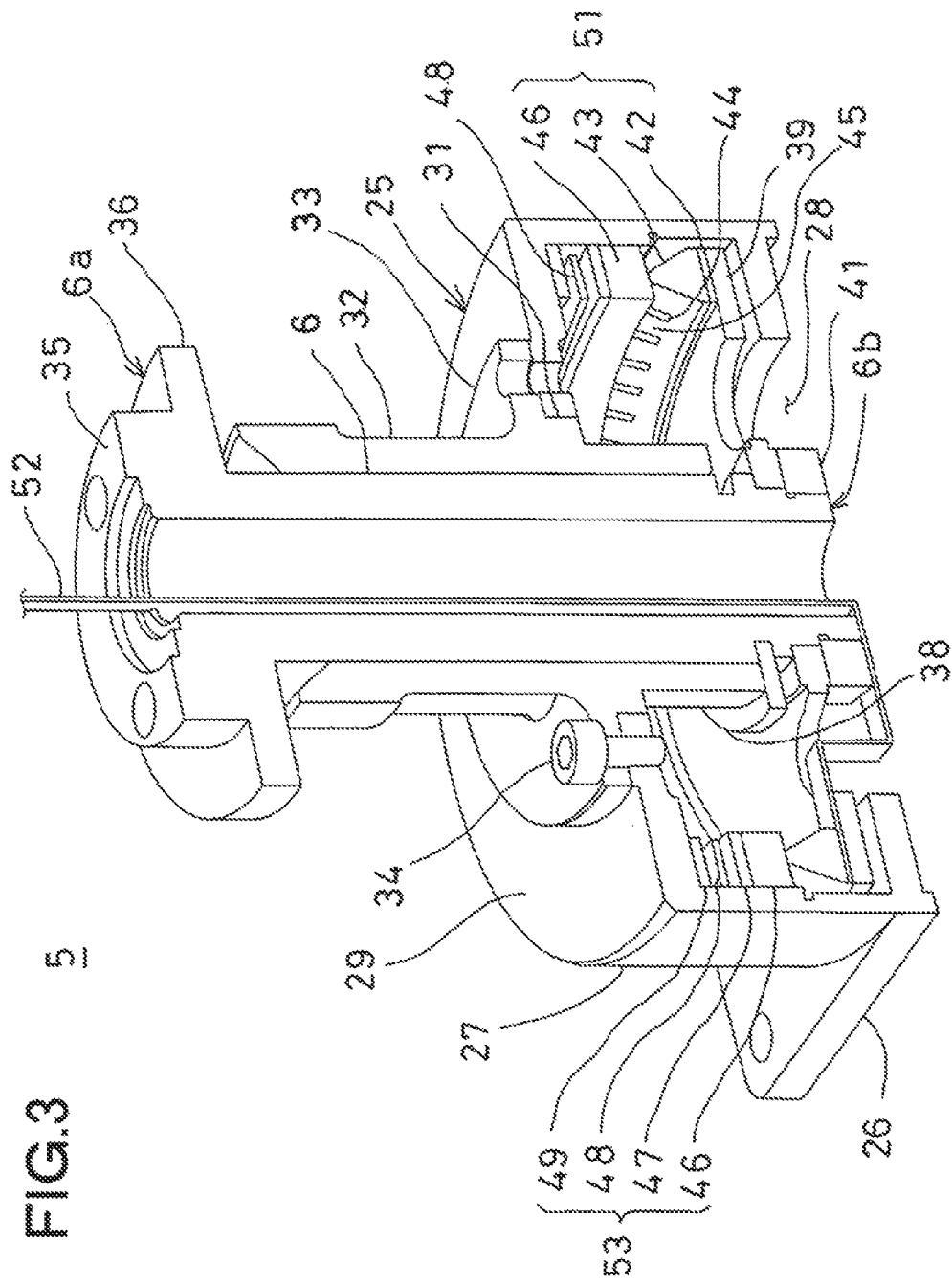
FIG. 3 is a cross-sectional perspective view of an ultrasonic motor used in the embodiment.

It is to be noted that, in FIG. 2 and FIG. 3, the same component as shown in FIG. 1 is referred by the same symbol, and a description thereof is not given here.

In the drawing, reference numeral 21 denotes a horizontal angle detection encoder provided with respect to the horizontal output shaft 6, reference numeral 22 denotes a vertical angle detection encoder 22 provided with respect to the vertical rotary shaft 11, and reference numeral 23 denotes a control unit that is provided inside the frame unit 7 and controls the drive of the horizontal rotary drive unit 5 and the vertical rotary drive unit 12.

In FIG. 3, the horizontal rotary drive unit 5 and the vertical rotary drive unit 12 will now be described more concretely. It is to be noted that the horizontal rotary drive unit 5 and the vertical rotary drive unit 12 have the same structure, and hence the horizontal rotary drive unit 5 will be described below.

A motor case 25 has a structure that a hollow cylindrical body 27 is protruded on a bottom plate 26. A bottom hole 28 is provided at the bottom plate 26, a top hole 31 is provided at a top plate 29 of the hollow cylindrical body 27, and the bottom hole 28 and the top hole 31 are concentrically arranged.

A cylindrical bearing member 32 is engaged with the top hole 31 from above. A fixed flange 33 is formed around the bearing member 32, and the fixed flange 33 is fixed to the top plate 29 by a bolt 34. Therefore, the bearing member 32 is fixed to the top plate 29 via the fixed flange 33, and a shaft center line of the bearing member 32 is concentric with the bottom hole 28 and the top hole 31.

The horizontal output shaft 6 rotatably penetrates through the bearing member 32, and an upper end portion 6a and a lower end portion 6b of the horizontal output shaft 6 protrude from the bearing member 32, respectively.

A coupling portion 35 is formed at an upper end of the horizontal output shaft 6, and a shaft portion's flange 36 is continuously formed at a lower end of the coupling portion 35. A pattern ring 37 of the horizontal angle detection encoder 21 is fixed to the shaft portion flange 36 (see FIG. 2). The coupling portion 35 is coupled with a bottom surface of the frame unit 7 in a spigot-like fashion and fixed to a bottom surface of the pattern ring 37 by a bolt (not shown) (see FIG. 2).

A retaining ring 38 is provided to the lower end portion 6b, and by engaging the retaining ring 38 with the lower end of the bearing member 32, a displacement of the horizontal output shaft 6 in a shaft center direction is suppressed.

A part of the lower end portion 6b, which extends downward from the retaining ring 38, has a step structure with two steps. A rotating plate 39 as a rotating body is fixed to a first step and a fixing nut 41 is screwed to a second step. The rotating plate 39 has a diameter smaller than the inner diameter of the hollow cylindrical body 27, and the rotating plate 39 is in a condition separated from the bottom plate 26. A displacement of the rotating plate 39 in the shaft center line direction is restricted by the fixing nut 41, and the rotating plate 39 is arranged so as to integrally rotate with the horizontal output shaft 6.

A piezoelectric ceramic (a piezoelectric element) 42 with a thin sheet ring-shape is secured to an upper surface of the rotating plate 39 concentrically with the rotating plate 39, and a vibrator 43 is fixed to the upper side of the piezoelectric ceramic 42 with intimate contact. The vibrator 43 is made of an elastic material, and the vibrator 43 has a ring shape with a radius (a central radius) R. The slits 44 are formed in the vibrator 43 in a circumferential direction at a predetermined pitch, the slits 44 separate the necessary ranges from the top toward the lower side, and form the comb teeth 45 as arranged in the circumferential direction at predetermined intervals. Further, an aggregate of the comb teeth 45, which are arranged in the circumferential direction at predetermined intervals, form a circumferential column group.

A fixing ring 46 as a stator is fitted in the hollow cylindrical body 27. The fixing ring 46 can be displaced in the shaft center line direction with respect to the hollow cylindrical body 27 and can freely rotate in the circumferential direction. The fixing ring 46 has the same diameter as the vibrator 43 and is placed on the vibrator 43, and the vibrator 43 and the fixing ring 46 are mechanically in contact with each other.

A necessary space is formed between an upper surface of the fixing ring 46 and a lower surface of the top plate 29, and a ring-shaped friction sheet 47, a wave washer 48 as a biasing member, and a friction sheet 49 are accommodated in the space.

The friction sheet 47 is fixed on the upper surface of the fixing ring 46 by necessary means such as gluing, and the friction sheet 49 is fixed on the lower surface of the top plate 29 by necessary means such as gluing. The wave washer 48 is interposed between the friction sheet 47 and the friction sheet 49, and the wave washer 48 biases the friction sheet 47 and the friction sheet 49 in opposite directions. The friction sheet 47 and the friction sheet 49 are interposed in a rotational force transmission path between the fixing ring 46 and the top plate 29, and function as a friction generating member that generates the necessary friction.

Further, the biasing force of the wave washer 48 is transmitted to the fixing ring 46 through the friction sheet 47, and the wave washer 48 presses the fixing ring 46 against the vibrator 43 with the predetermined force.

Due to the biasing force of the wave washer 48, the friction force F1, which is generated between the wave washer 48 and each of the friction sheet 47 and the friction sheet 49, acts between the fixing ring 46 and the top plate 29 (i.e., the motor case 25), and the friction force F2 according to the pressing force of the wave washer 48 is generated between the fixing ring 46 and the vibrator 43.

By applying a high-frequency wave to the piezoelectric ceramic 42, an ultrasonic vibration is generated, and flexural vibration is produced in the comb teeth 45. Further, the circumferential column group, which is an aggregate of the comb teeth 45, forms a flexural vibration wave (flexural wave motion) that moves in the circumferential direction by the flexural vibration, and the flexural vibration wave relatively rotates the fixing ring 46 via the friction force. Further, by controlling the high-frequency wave applied to the piezoelectric ceramic 42, it will become possible to be able to control a rotating speed and a rotating direction of the fixing ring 46. Here, the piezoelectric ceramic 42 and the vibrator 43 make up a vibration generating unit, and the piezoelectric ceramic 42, the vibrator 43, and the fixing ring 46 make up an ultrasonic motor 51.

It is to be noted that reference numeral 52 in the drawing denotes a cable, and the cable 52 is electrically connected to the piezoelectric ceramic 42, inserted into a hollow portion of the horizontal output shaft 6, and electrically connected to the control unit 23.

Then, the friction force F1 acts between the fixing ring 46 and the top plate 29, and the top plate 29, i.e., the motor case 25 relatively rotates with respect to the vibrator 43 via the friction force F1.

In the case of this embodiment, since the motor case 25 is fixed to the base unit 4, the fixing ring 46 is fixed to the motor case 25 by the friction force F1, and the vibrator 43 rotates.

The rotation of the vibrator 43 is transmitted to the horizontal output shaft 6 via the rotating plate 39, and the frame unit 7 rotates via the horizontal output shaft 6 (see FIG. 2).

Then, in a state where the high-frequency wave is not applied to the piezoelectric ceramic 42, i.e., a state where the ultrasonic motor 51 is not driven, the friction force F1 acts between the fixing ring 46 and the top plate 29, the friction force F2 acts between the vibrator 43 and the fixing ring 46, and hence the horizontal output shaft 6 (i.e., the frame unit 7) is fixed by friction forces F1 and F2.

Further, between the friction force F1 and the friction force F2, a relationship of the friction force F1<the friction force F2 exists, and the restricting force acts for the rotation due to the friction torque T1<the friction torque T2. It is to be noted that, in order to realize the friction force F1<the friction force F2, a friction coefficient between each of the friction sheet 47 or the friction sheet 49 and the wave washer 48 and the biasing force of the wave washer 48 are appropriately selected. In addition, as a material of the friction sheet 47 and the friction sheet 49, there is a polymer compound, e.g., a polymer compound such as a fluororesin, and if conditions are met, there is also a metal or a material obtained by giving a treatment to a surface of the metal or the like.

The friction torque T1 is determined according to a friction coefficient between the fixing ring 46 and the top plate 29 and the pressing force of the wave washer 48. The friction coefficient is selected by changing the material of the friction sheet 47 and the friction sheet 49, and the pressing force is changed by changing a material, a board thickness, and a shape of the wave washer 48. Therefore, adjusting the friction coefficient and the pressing force enables selecting the optimum friction torque T1.

Here, when the rotational force M>T1 is allowed to act on the horizontal output shaft 6 as an external force, the horizontal output shaft 6 rotates according to the relationship of the friction torque. Further, in a state where the horizontal output shaft 6 is rotating, the rotational force M<T2 is achieved, and the vibrator 43 and the fixing ring 46 are in a fixed state.

Therefore, in the surveying instrument 1, when the rotational force M is manually operated to the frame unit 7 in a non-driving state of the horizontal rotary drive unit 5, the frame unit 7 rotates with the horizontal output shaft 6 as the center, and the frame unit 7 can be fixed at an arbitrary position.

Further, this can be likewise with respect to the telescope unit 9, and even if the vertical rotary drive unit 12 is set in the non-driving state, the telescope unit 9 can manually rotate, and the telescope unit 9 can be fixed at an arbitrary position.

Therefore, the fixing ring 46, the friction sheet 47, the friction sheet 49, and the wave washer 48 make up a clutch mechanism 53. In the driving state of the ultrasonic motor 51, the clutch mechanism 53 transmits the rotational force to the horizontal output shaft 6. Further, in the non-driving state of the ultrasonic motor 51, the rotation of the horizontal output shaft 6 is allowed in accordance with the external force.

Further, the clutch mechanism 53 also functions as a safety device that causes a slip between the motor case 25 and the fixed ring 46 and avoids the damage to the ultrasonic motor 51 in a case where an excess load acted on the horizontal output shaft 6 during the drive of the ultrasonic motor 51.

As described above, in the present embodiment, since an error factor such as a backlash does not exist in a path through which the rotational force from the ultrasonic motor 51 is transmitted to the horizontal output shaft 6 and the rotational force of the ultrasonic motor 51 is directly transmitted to the horizontal output shaft 6, the highly accurate rotation control can be carried out, further, the number of components is small, and the number of rotating portions (the horizontal output shaft 6 alone in the drawings), is small, and hence the assembling errors are reduced.

Further, when the ultrasonic motor 51 is not driven, the rotation unit can be manually rotated. In this case, a slip is not caused between the piezoelectric ceramic 42 and the fixing ring 46 at this moment, so abrasion does not occur. Therefore, the ultrasonic motor 51 can maintain high accuracy for a long time.

In a case where distance measurement and angle measurement is carried out by using the surveying instrument 1 provided with the horizontal rotary drive unit 5 and the vertical rotary drive unit 12, in a state that the horizontal rotary drive unit 5 and the vertical rotary drive unit 12 are not driven, the frame unit 7 is manually rotated in the horizontal direction and the telescope unit 9 is rotated in the vertical direction. The sighting telescope 10 is visually sighted on an object to be measured, the horizontal rotary drive unit 5 and the vertical rotary drive unit 12 are driven when the object to be measured is captured in a viewing field of the sighting telescope 10, and sighting is performed automatically on the object to be measured.

In a state where the object to be measured is sighted, a distance is measured, further, a horizontal angle and a vertical angle in the sighted state are measured by the horizontal angle detection encoder 21 and the vertical angle detection encoder 22, and the distance measurement and the angle measurement are performed.

In the surveying instrument 1, by using the horizontal rotary drive unit 5 and the vertical rotary drive unit 12, the structure of the drive system and its periphery is simplified, the number of components is reduced, and the number of components requiring accuracy is reduced, and a manufacturing cost can be lowered. Further, since the number of rotation units is reduced and the frame unit 7 and the telescope unit 9 are directly driven, highly accurate drive becomes possible, and a decrease in accuracy over time can be avoided.

It is to be noted that the ultrasonic motors are used for both the horizontal rotary drive unit 5 and the vertical rotary drive unit 12, in the embodiment given above, but the ultrasonic motor may be used for one of these drive units alone.

It is to be noted that the above-described surveying instrument 1 concerns a total station, but as another example of the surveying instrument, there is a laser scanner that emits a distance measurement light via a deflection mirror, further rotates the deflection mirror in a horizontal direction and a vertical direction, irradiates a laser beam in a predetermined range and measures multiple points, and the present embodiment may be applied to the laser scanner.

The invention claimed is:

1. A rotary drive unit of a surveying instrument which comprises a rotation unit adapted to direct a distance measuring optical axis to an object to be measured and the rotary drive unit rotates said rotation unit, comprising:
    a rotary motor for rotating an output shaft; and
    a clutch unit for connecting or disconnecting said rotary motor and said output shaft, wherein said rotary motor and said clutch unit are arranged concentrically and in a series along said output shaft, and said output shaft is fixed to said rotation unit.

2. The rotary drive unit of a surveying instrument according to claim 1, wherein said rotary motor rotates a driven body via a friction force,
    said clutch unit is interposed between said driven body and said rotation unit and configured so as to transmit the rotation of said driven body to said rotation unit via the friction force, and
    the friction force between said rotary motor and said driven body is set to be larger than the friction force between said driven body and said rotation unit.

3. The rotary drive unit of a surveying instrument according to claim 2, wherein said driven body has a ring-like shape and said rotary motor comprises a ring-shaped vibration generating unit that provides said driven body with the rotational force,
   wherein said vibration generating unit generates a flexural wave motion that moves in a circumferential direction by ultrasonic vibration, and
   said flexural wave motion adapted to rotate said driven body via the friction force between said rotary motor and said driven body.

4. The rotary drive unit of a surveying instrument according to claim 3, wherein said output shaft is provided so as to integrally rotate with said vibration generating unit, and said driven body is provided on a member that supports said rotation unit.

5. A surveying instrument comprising:
   a frame unit as a rotation unit provided on a base unit so as to be rotatable in the horizontal direction,
   a horizontal rotary drive unit provided on said base unit and drives said frame unit to rotate,
   a telescope unit as a rotation unit provided on said frame unit so as to be rotatable in a vertical direction, and
   a vertical rotary drive unit that is provided on said frame unit and drives said telescope unit to rotate,
   wherein a rotary drive unit according to claim 3 is used for at least one of said horizontal rotary drive unit and said vertical rotary drive unit.

6. The rotary drive unit of a surveying instrument according to claim 2, wherein said clutch unit has a structure to enable selecting the friction force between said rotation unit and said driven body.

7. The rotary drive unit of a surveying instrument according to claim 6, wherein said clutch unit comprises a friction generating member interposed in a rotational force transmission path and a biasing means for allowing the pressing force to act on said friction generating member.

8. The rotary drive unit of a surveying instrument according to claim 2, wherein said clutch unit comprises a friction generating member interposed in a rotational force transmission path and a biasing means for allowing the pressing force to act on said friction generating member.

9. A surveying instrument comprising:
   a frame unit as a rotation unit provided on a base unit so as to be rotatable in the horizontal direction,
   a horizontal rotary drive unit provided on said base unit and drives said frame unit to rotate,
   a telescope unit as a rotation unit provided on said frame unit so as to be rotatable in a vertical direction, and
   a vertical rotary drive unit that is provided on said frame unit and drives said telescope unit to rotate,
   wherein a rotary drive unit according to claim 2 is used for at least one of said horizontal rotary drive unit and said vertical rotary drive unit.

10. The rotary drive unit of a surveying instrument according to claim 1, wherein said clutch unit comprises a friction generating member interposed in a rotational force transmission path and a biasing means for allowing the pressing force to act on said friction generating member.

11. A surveying instrument comprising:
   a frame unit as a rotation unit provided on a base unit so as to be rotatable in the horizontal direction,
   a horizontal rotary drive unit provided on said base unit and drives said frame unit to rotate,
   a telescope unit as a rotation unit provided on said frame unit so as to be rotatable in a vertical direction, and
   a vertical rotary drive unit that is provided on said frame unit and drives said telescope unit to rotate,
   wherein a rotary drive unit according to claim 1 is used for at least one of said horizontal rotary drive unit and said vertical rotary drive unit.

\* \* \* \* \*